United States Patent
Lin et al.

(10) Patent No.: US 9,696,825 B2
(45) Date of Patent: Jul. 4, 2017

(54) METHOD FOR MAKING CURSOR CONTROL TO HANDHELD TOUCHSCREEN COMPUTER BY PERSONAL COMPUTER

(71) Applicant: I/O INTERCONNECT, LTD., Santa Ana, CA (US)

(72) Inventors: Kun-Yuan Lin, Taipei (TW); Chung-Han Hsieh, Taipei (TW)

(73) Assignee: I/O INTERCONNECT, LTD., Santa Ana, CA (US)

( * ) Notice: Subject to any disclaimer, the term of this patent is extended or adjusted under 35 U.S.C. 154(b) by 0 days.

(21) Appl. No.: 14/924,820

(22) Filed: Oct. 28, 2015

(65) Prior Publication Data

US 2016/0216782 A1    Jul. 28, 2016

Related U.S. Application Data

(63) Continuation-in-part of application No. 14/607,046, filed on Jan. 27, 2015.

(51) Int. Cl.
| | |
|---|---|
| G06F 3/0481 | (2013.01) |
| G06F 3/038 | (2013.01) |
| G06F 3/0488 | (2013.01) |
| G06F 3/0484 | (2013.01) |

(52) U.S. Cl.
CPC ............ *G06F 3/038* (2013.01); *G06F 3/0481* (2013.01); *G06F 3/0484* (2013.01); *G06F 3/0488* (2013.01)

(58) Field of Classification Search
CPC ........ G06F 3/041; G06F 1/1626; G06F 3/038; G06F 3/0488; G06F 3/0484; G06F 3/0481

USPC .......................................... 345/173; 455/557
See application file for complete search history.

(56) References Cited

U.S. PATENT DOCUMENTS

| | | |
|---|---|---|
| 6,999,008 B2 | 2/2006 | Wang et al. |
| 7,450,031 B2 | 11/2008 | Wang et al. |
| 7,479,902 B2 | 1/2009 | Wang et al. |
| 8,276,085 B2 | 9/2012 | Sherwani |
| 8,825,034 B2 | 9/2014 | Ton et al. |
| 9,098,429 B2 | 8/2015 | Varanda et al. |
| 2003/0220988 A1 | 11/2003 | Hymel |
| 2007/0124358 A1 | 5/2007 | Levi et al. |
| 2008/0071935 A1 | 3/2008 | Ohta |
| 2010/0045611 A1 | 2/2010 | Nelson et al. |
| 2011/0113166 A1 | 5/2011 | Hung et al. |
| 2011/0225553 A1 | 9/2011 | Abramson et al. |

(Continued)

OTHER PUBLICATIONS

Accessory Development Kit 2012 Guide, Android Developers—Accessory Development Kit 2012, 1-14.

*Primary Examiner* — Premal Patel
(74) *Attorney, Agent, or Firm* — Locke Lord LLP; Tim Tingkang Xia, Esq.

(57) ABSTRACT

The method includes the steps of: a) connecting a handheld touchscreen computer with a first display to a personal computer with a second display and mouse, wherein a screen picture of the handheld touchscreen computer is projected on the second display as a subwindow, and a cursor is shown on the second display; b) directly moving the cursor by the mouse when no item in the subwindow is clicked; c) calculating a displacement quantity of the cursor against a virtual origin of the subwindow when an item in the subwindow is being clicked; and d) generating a mouse event to an item of the handheld touchscreen computer at a position corresponding to the displacement quantity.

9 Claims, 3 Drawing Sheets

(56) References Cited

U.S. PATENT DOCUMENTS

| | | | |
|---|---|---|---|
| 2012/0040719 A1* | 2/2012 | Lee | G06F 1/1626 455/557 |
| 2012/0098733 A1* | 4/2012 | Masuda | G06F 3/1454 345/2.2 |
| 2013/0050222 A1 | 2/2013 | Moran et al. | |
| 2013/0181898 A1 | 7/2013 | Liu | |
| 2013/0307796 A1* | 11/2013 | Liu | G06F 3/041 345/173 |
| 2014/0189679 A1 | 7/2014 | Adams et al. | |
| 2014/0258367 A1 | 9/2014 | Suryavanshi et al. | |
| 2014/0258368 A1 | 9/2014 | Suryavanshi et al. | |
| 2014/0330992 A1 | 11/2014 | Li | |
| 2015/0363182 A1 | 12/2015 | He | |
| 2016/0034058 A1 | 2/2016 | Stauber et al. | |

\* cited by examiner

METHOD FOR MAKING CURSOR CONTROL TO HANDHELD TOUCHSCREEN COMPUTER BY PERSONAL COMPUTER

CROSS-REFERENCE TO RELATED APPLICATIONS

This application is a continuation-in-part of U.S. patent application Ser. No. 14/607,046, filed Jan. 27, 2015, now pending.

BACKGROUND OF THE INVENTION

1. Technical Field

The invention relates to handheld touchscreen computers such as smartphones and tablet computers, particularly to connection between a handheld touchscreen computer and a personal computer with a cursor control device such as a mouse or a touchpad.

2. Related Art

Handheld touchscreen computers, such as smartphones and tablets, have become essential for most people. Users of handheld touchscreen computers have the need to connect their handheld touchscreen computers to an external personal computer such as a desktop or a laptop computer which serves as a second computer. Specific applications can open a subwindow within a screen picture on the display of the external personal computer to show a screen picture of the handheld touchscreen computer on the personal computer when the handheld touchscreen computer has been connected to the personal computer. A personal computer must be equipped with a cursor control device such as a mouse or a touchpad. A cursor will appear on the screen picture of the personal computer and another cursor will correspondingly appear on the screen picture of the handheld touchscreen computer. Such applications allow users to operate the handheld touchscreen computer with the cursor and cursor control device as though they are directly operating the handheld touchscreen computer.

However, neither the operating systems nor the display resolutions of a personal computer and handheld touchscreen computer are identical. Typically, a personal computer would usually use MICROSOFT WINDOWS as the operating system, and a handheld touchscreen computer would use either ANDROID or APPLE iOS. When the cursor moves within the subwindow, the application has to keep converting coordinates of every point the cursor travels into new coordinates compatible with the handheld touchscreen computer and then sending the new coordinates to the handheld touchscreen computer so as to synchronize the location and movement of the two cursors in the personal computer and the handheld touchscreen computer. This will make movement of the cursor seem seriously lagged and jumpy. However, there is no solution on the market yet.

SUMMARY OF THE INVENTION

An object of the invention is to provide a method for making a cursor control to a handheld touchscreen computer by a personal computer, which can avoid the lagging problem of movement of the cursor when it travels within the subwindow corresponding to the handheld touchscreen computer.

To accomplish the above said object, the method for making a cursor control to a handheld touchscreen computer with a first display by a personal computer with a second display and a cursor control device of the invention includes the steps of:

a) operatably connecting the handheld touchscreen computer to the personal computer, wherein a screen picture of the handheld touchscreen computer is projected on the second display of the personal computer as a subwindow, a cursor of an operating system of the personal computer is shown on the second display, and the handheld touchscreen computer is under a cursor mode;

b) directly moving the cursor by the cursor control device without coordinate conversion when no item in the subwindow is being clicked by the cursor;

c) calculating a displacement quantity of the cursor with respect to a virtual origin the subwindow when an item in the subwindow is being clicked by the cursor; and d) generating a mouse event to an item of the handheld touchscreen computer at a position corresponding to the displacement quantity in the first display.

DETAILED DESCRIPTION OF THE INVENTION

Figure 1:
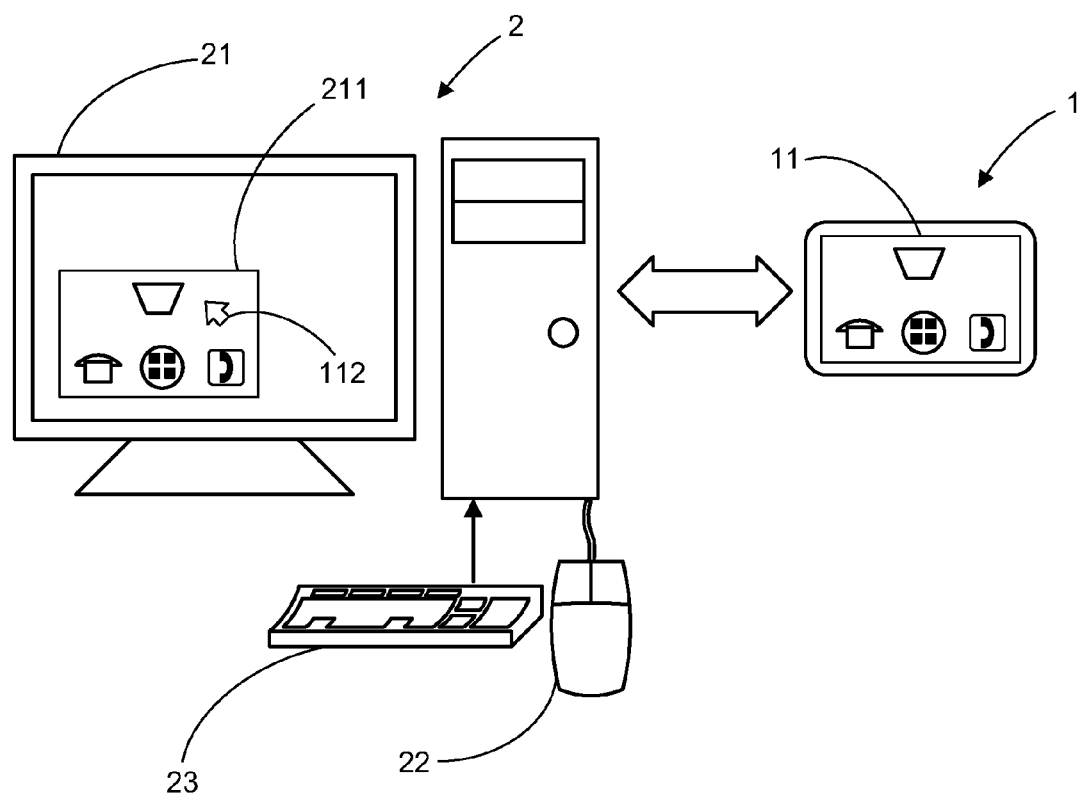
FIG. 1 is a schematic view of hardware arrangement of the invention.

Please refer to FIG. 1. The invention provides a method for controlling cursor in a handheld touchscreen computer 1 connected with personal computer 2. The handheld touchscreen computer 1 may be a smartphone or a tablet computer. Of course, the handheld touchscreen computer 1 and the personal computer 2 must be provided with a first display 11 and a second display 21, respectively. Additionally, the personal computer 2 is provided with a keyboard 23 and a cursor control device 22 such as a mouse or touchpad.

Figure 2:
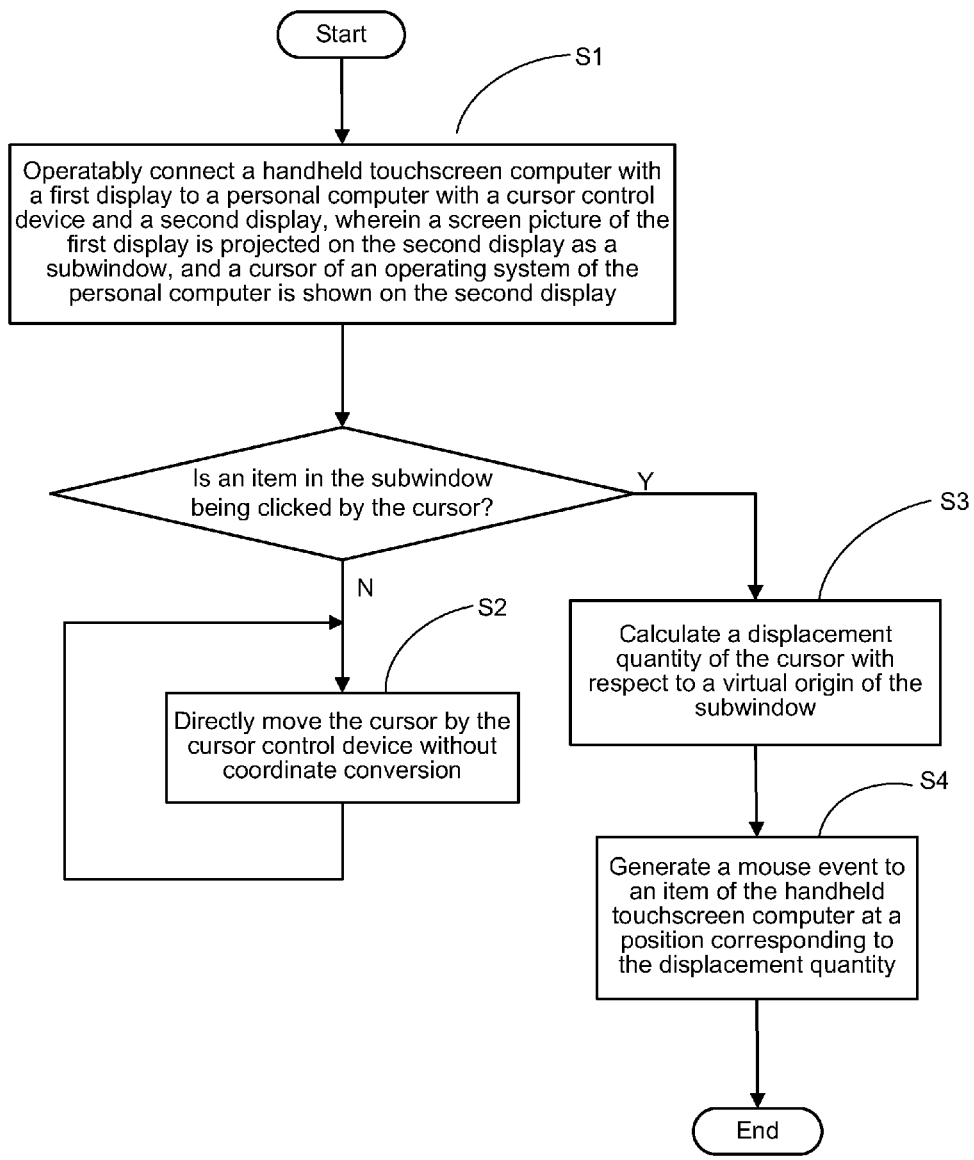
FIG. 2 is a flowchart of the method of the invention.

Please refer to FIG. 2, which shows a flowchart of the method of the invention. In step S1, the handheld touchscreen computer 1 is operatably connected to the personal computer 2 with the cursor control device 22. The connection between the handheld touchscreen computer 1 and the personal computer 2 may be wired or wireless. Such a wired connection may be implemented by a USB (universal serial bus) cable. In detail, an AOA (Android Open Accessory) protocol is performed between the handheld touchscreen computer 1 and the personal computer 2 through the USB cable. A wireless connection between the handheld touchscreen computer 1 and the personal computer 2 may be implemented by a BLUETOOTH or Wi-Fi communication protocol. A screen picture of the handheld touchscreen computer 1 is projected on the second display 21 of the personal computer 2 as a subwindow 211. A cursor 212 of an operating system, such as WINDOWS, is shown on the second display 21. The personal computer 2 still keeps working independently. The screen picture of the handheld touchscreen computer 1 is shown on the second display 21 just as a subwindow 211. Of course, all contents including items, pictures and their relative position of the subwindow 211 are the same as the handheld touchscreen computer 1. The cursor 212 can be driven by the cursor control device 22 to travel inside or outside the subwindow 211.

In step S2, the cursor 212 is directly moved by the cursor control device 22 without coordinate conversion when no item in the subwindow 211 is being clicked by the cursor 212. That is to say, the cursor 212 completely belongs to the personal computer 2 and the movement of the cursor 212 will not be lagged if no item in the subwindow 211 is clicked.

Figure 3:
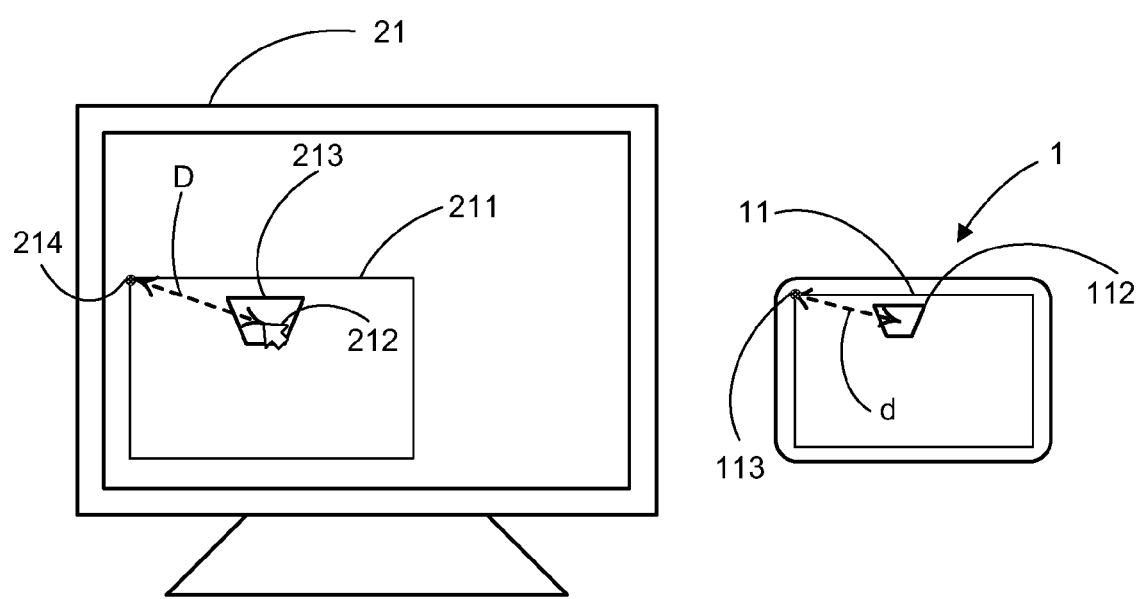
FIG. 3 is a schematic view showing the calculation of the displacement quantity of the second cursor.

Please refer to FIG. 3. In step S3, a displacement quantity D of the cursor 212 with respect to a virtual origin 214 at an upper left corner of the subwindow 211 is calculated when an item 213 in the subwindow 211 is being clicked by the cursor 212. It is noted that the virtual origin 214 is not limited to an upper left corner of the subwindow 211, any one of other corners is available.

Finally, in step S4, a mouse event is generated to an item of the handheld touchscreen computer at a position corresponding to the displacement quantity D in the first display 11. In other words, a virtual touch is generated to an item 112 at a position according to a corresponding displacement quantity d with respect to a real origin 113 at the upper left corner of the first display 11, in which the displacement quantity d is proportional to the displacement quantity D. The item 112 in the first display 11 is the same as the item 213 in the subwindow 211. Of course, the real origin 113 is not limited to the upper left corner of the first display 11, but both the real origin 113 and the virtual origin 214 must be at the same corner of the first display 11 and the subwindow 211, respectively.

In sum, coordinate conversion will be implemented only when an item in a subwindow is being clicked, otherwise no coordinate conversion will be implemented. This will make the movement of the cursor as smooth as no link with other device.

It will be appreciated by persons skilled in the art that the above embodiment has been described by way of example only and not in any limitative sense, and that various alterations and modifications are possible without departure from the scope of the invention as defined by the appended claims.

What is claimed is:

1. A method for making a cursor control to a handheld touchscreen computer with a first display connected by a personal computer with a second display and a cursor control device, comprising the steps of:

a) operatably connecting the handheld touchscreen computer to the personal computer, wherein a screen picture of the handheld touchscreen computer is projected on the second display of the personal computer as a subwindow, and a cursor of an operating system of the personal computer is shown on the second display;

b) directly moving the cursor by the cursor control device through the personal computer without transmitting any coordinate conversion signal from the personal computer to the handheld touchscreen computer when no item in the subwindow is being clicked by the cursor;

c) calculating a displacement quantity of the cursor with respect to a virtual origin of the subwindow for transmitting a coordinate conversion signal from the personal computer to the handheld touchscreen computer when an item in the subwindow is being clicked by the cursor; and d) generating a mouse event to an item of the handheld touchscreen computer at a position in the first display according to the coordinate conversion signal.

2. The method of claim 1, wherein the handheld touchscreen computer is a smartphone or a tablet computer.

3. The method of claim 1, wherein a connection between the handheld touchscreen computer and the personal computer is a wired link.

4. The method of claim 3, wherein the wired link is a USB (universal serial bus) cable.

5. The method of claim 4, wherein an AOA (Android Open Accessory) protocol is performed between the handheld touchscreen computer and the personal computer through the USB cable.

6. The method of claim 1, wherein a connection between the handheld touchscreen computer and the personal computer is a wireless link.

7. The method of claim 6, wherein the wireless connection is a BLUETOOTH or Wi-Fi communication protocol.

8. The method of claim 1, wherein the cursor control device is a mouse or touchpad.

9. The method of claim 1, wherein the virtual origin is located at an upper left corner of the subwindow.

\* \* \* \* \*